US012215700B1

(12) United States Patent
Wu

(10) Patent No.: US 12,215,700 B1
(45) Date of Patent: Feb. 4, 2025

(54) FAN CAPABLE OF ADJUSTING SPEED OF AIRFLOW

(71) Applicant: Rayprus Technology (Foshan) Co., Ltd., Foshan (CN)

(72) Inventor: Chang-Hua Wu, New Taipei (TW)

(73) Assignee: Rayprus Technology (Foshan) Co., Ltd., Foshan (CN)

( * ) Notice: Subject to any disclaimer, the term of this patent is extended or adjusted under 35 U.S.C. 154(b) by 0 days.

(21) Appl. No.: 18/588,202

(22) Filed: Feb. 27, 2024

(30) Foreign Application Priority Data

Dec. 28, 2023 (CN) ......................... 202311842256.2

(51) Int. Cl.
*F04D 29/32* (2006.01)
*F04D 19/00* (2006.01)
*F04D 27/00* (2006.01)

(52) U.S. Cl.
CPC ......... *F04D 19/002* (2013.01); *F04D 27/004* (2013.01); *F05D 2270/80* (2013.01)

(58) Field of Classification Search
CPC ...... F04D 19/002; F04D 27/004; F04D 29/32; F04D 29/323; F04D 29/325; F05D 2270/80; F24F 11/0001; F24F 11/79
See application file for complete search history.

(56) References Cited

U.S. PATENT DOCUMENTS 10,641,517 B2 * 5/2020 Song ...................... G06V 40/28
2023/0391158 A1 * 12/2023 Smith ...................... F24F 11/63

FOREIGN PATENT DOCUMENTS

KR 20180018594 A * 2/2018

* cited by examiner

*Primary Examiner* — David E Sosnowski
*Assistant Examiner* — Maxime M Adjagbe
(74) *Attorney, Agent, or Firm* — ScienBiziP, P.C.

(57) ABSTRACT

A fan designed for directed airflow towards a target object. The fan includes a fan body producing an airflow and an airflow adjusting module that adjusts the airflow speed based on the distance to the target object. The airflow adjusting module includes a first sensor for distance measurement, a variable hood with a variable opening, and a controller. The controller, connected to the first sensor and the variable hood, regulates the variable opening size in response to distance information. The fan's adaptive airflow control ensures consistent air strength for the target object, adapting to varying distances.

17 Claims, 4 Drawing Sheets

22

FAN CAPABLE OF ADJUSTING SPEED OF AIRFLOW

FIELD

The subject matter herein generally relates to cooling system, and more particularly, to a fan capable of adjusting speed of airflow and target object sensing functions.

BACKGROUND

Fans are devices for cooling and providing comfortable cool air. A fan uses electromagnetic conversion to drive the fan blades to rotate. As the blades rotate, air is drawn into the fan and then expelled outward, thereby forming an airflow to achieve the purpose of cooling or ventilation.

The fan may also adjust the speed of the airflow according to a manual input. Such adjustment is not flexible and cannot adapt to different application scenarios.

BRIEF DESCRIPTION OF THE DRAWINGS

Implementations of the present technology will now be described, by way of example only, with reference to the attached figures.

DETAILED DESCRIPTION

Figure 1:
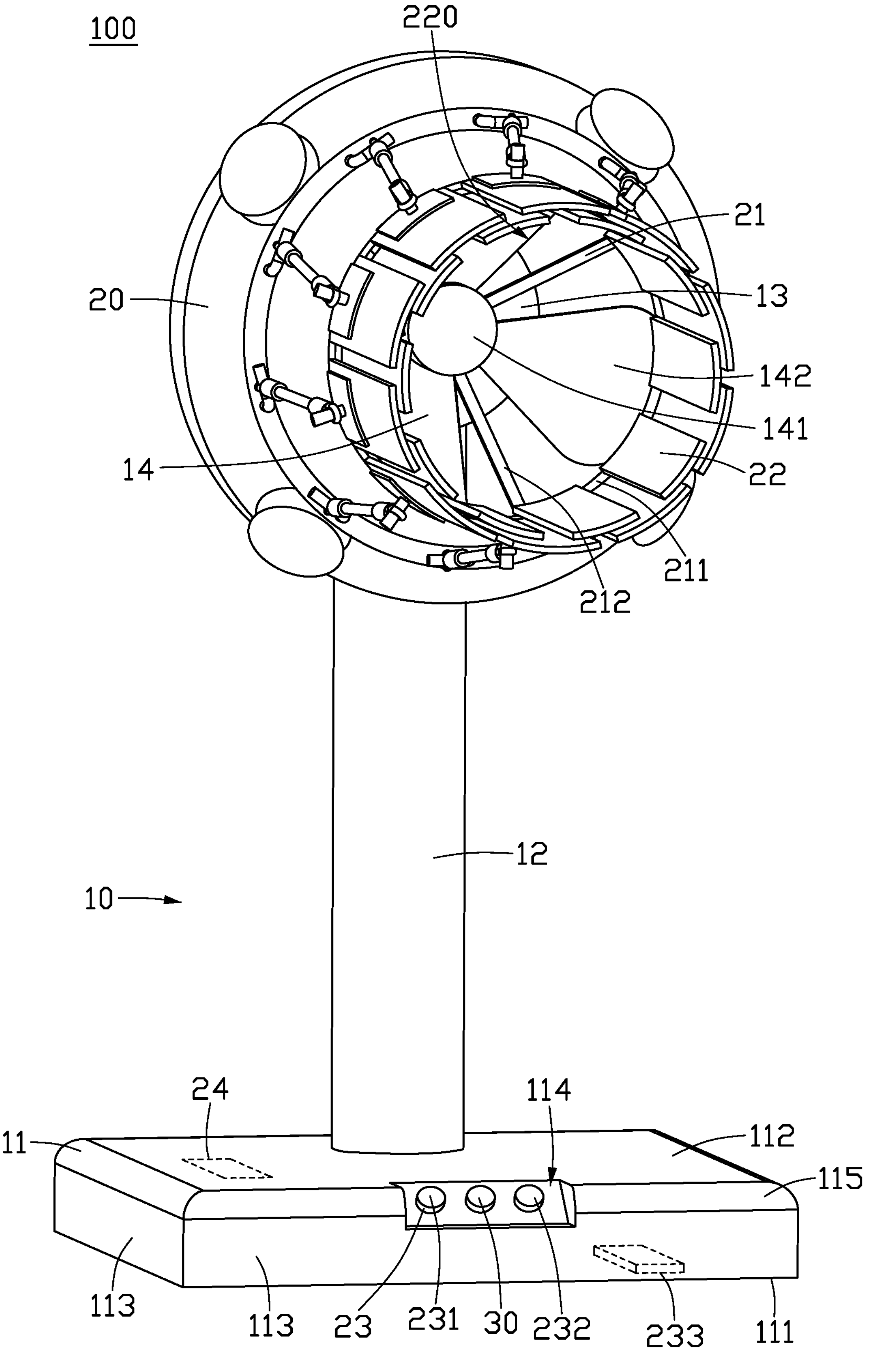
FIG. 1 is a diagrammatic view of an embodiment of a fan according to the present disclosure.

It will be appreciated that for simplicity and clarity of illustration, where appropriate, reference numerals have been repeated among the different figures to indicate corresponding or analogous members. In addition, numerous specific details are set forth in order to provide a thorough understanding of the embodiments described herein. However, it will be understood by those of ordinary skill in the art that the embodiments described herein can be practiced without these specific details. In other instances, methods, procedures, and members have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to;" it specifically indicates open-ended inclusion or membership in the so-described combination, group, series, and the like.

Figure 2:
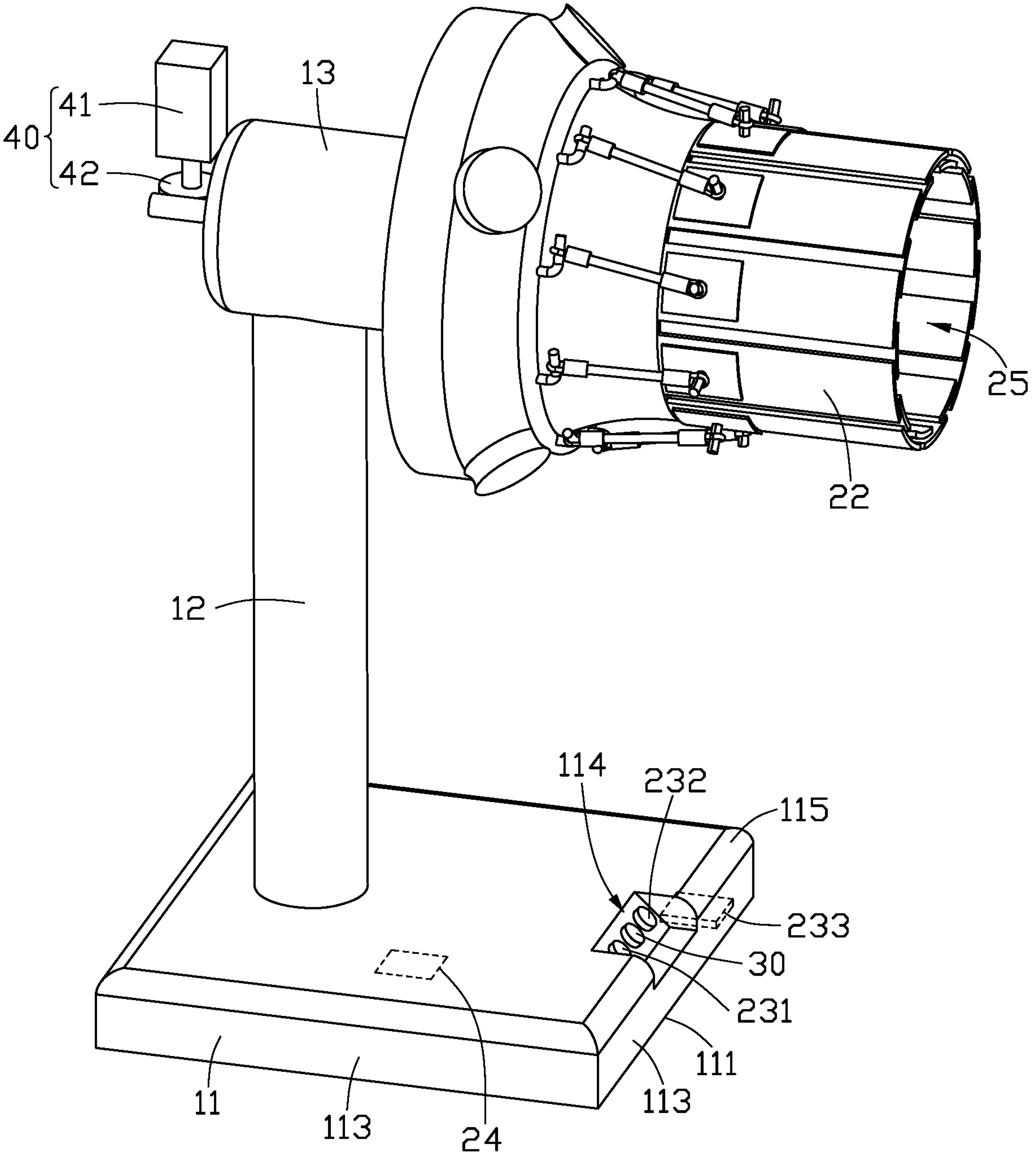
FIG. 2 is similar to FIG. 1, but showing the fan in another angle.

Referring to FIGS. 1 and 2, an embodiment of the present application provides a fan 100, which can be used to output a steady airflow even when a distance between the fan 100 and a target object changes. The fan 100 includes a fan body 10 and an airflow adjusting module 20 connected on the fan body 10. The fan body 10 may be used to output an airflow, while the airflow adjusting module 20 can adjust the speed of the airflow output by the fan body 10 based on the distance between the target object and the fan body 10. The target object may be a person. In other embodiments, the target object may also be a pet, a plant, or any specific entity or item based on user's needs or preferences.

The fan body 10 includes a base 11, a supporting column 12, a first driving member 13, and a fan blade assembly 14. An end of the supporting column 12 is connected to the base 11 along a vertical direction A. The first driving member 13 is connected to another end of the supporting column 12 away from the base 11. The fan blade assembly 14 is connected to the first driving member 13. The airflow adjusting module 20 is connected to the fan blade assembly 14. The first driving member 13 drives the fan blade assembly 14 to rotate, thereby generating the airflow.

Referring to FIGS. 1, 2, 3, and 4, the airflow adjusting module 20 includes a fixing hood 21, a variable hood 22, a first sensor 23, and a controller 24. The first sensor 23 is disposed on the base 11 and electrically connected to the controller 24. The controller 24 is electrically connected to the variable hood 22. The variable hood 22 is mounted around a periphery of the fixing hood 21 to form a receiving space 25. The fan blade assembly 14 is rotatably housed in the receiving space 25. The first sensor 23 is used to sense the distance between the target object and the fan body 10. The variable hood 22 defines a variable opening 220. The controller 24 adjusts a size of the variable opening 220 based on the distance, thereby controlling the airflow speed. In at least one embodiment, the variable hood 22 is a variable nozzle, the first sensor 23 is a Time-Of-Flight camera, and the controller 24 is a Programmable Logic Controller.

In use, the fan blade assembly 14 rotates by a constant speed. When the first sensor 23 senses that the distance between the target object and the fan body 10 increases, the controller 24 sends a first command to the variable hood 22 to decrease the size of the variable opening 220. The variable hood 22 receives this first command and reduces the size of the variable opening 220, thereby increasing the airflow speed through the variable opening 220. This allows the target object at an increased distance from the fan body 10 to feel a constant airflow. Conversely, when the first sensor 23 senses that the distance between the target object and the fan body 10 decreases, the controller 24 sends a second command to the variable hood 22 to increase the size of the variable opening 220. The variable hood 22 receives this second command and increases the size of the variable opening 220, thereby reducing the airflow speed through the variable opening 220. This allows the target object at a decreased distance from the fan body 10 to feel a constant airflow. The airflow speed is defined as the volume of airflow passing through the variable opening 220 per unit time.

Referring to FIGS. 1 and 2, in this embodiment, the base 11 is roughly rectangular. The base 11 includes a bottom plate 111, a top plate 112, and a plurality of connecting plates 113. The plurality of connecting plates 113 is connected between the bottom plate 111 and the top plate 112. A junction area 115 between the top plate 112 and one of the plurality of connecting plates 113 is recessed to form a groove 114. The first sensor 23 is exposed from the groove 114.

Referring to FIGS. 1 and 2, in this embodiment, the fan blade assembly 14 includes a fan seat 141 and a plurality of fan blades 142. The fan seat 141 is roughly cylindrical. The plurality of fan blades 142 are spaced apart from each other along an outer edge of the fan seat 141. A central region of the fan seat 141 is connected to the first driving member 13. The first driving member 13 drives the fan seat 141 and the plurality of fan blades 142 to rotate, thereby generate the airflow. In this embodiment, the number of fan blades 142 is five.

Referring to FIGS. 1 and 2, in this embodiment, the fixing hood 21 is roughly disk-shaped. The fixing hood 21 includes a frame 211 and a plurality of ribs 212. Each of the ribs 212 extends along a radial direction of the frame 211, and is connected to the inner side of the frame 211. One end of the ribs 212 away from the frame 211 is connected to the first driving member 13. The fixing hood 21 is used to prevent dust from entering the receiving space 25 to maintain cleanliness and to prevent children or pets from accidentally touching the rotating fan blades 142. In other embodiments, the shape and size of the fixing hood 21 may vary to adapt to different types of electric fans. For example, in other embodiments, the fixing hood 21 may fully enclosed to cover the entire fan blade assembly 14, or only cover the upper or lower part of the fan blade assembly 14.

In this embodiment, the variable hood 22 includes a mounting ring 221, a plurality of first blades 222, a plurality of second blades 223, and a plurality of second driving members 224. The mounting ring 221 defines a central axis P. One end of the first blade 222 is rotatably connected to a side of the mounting ring 221, and making the other end of the first blade 222 is close to or away from the central axis P. One end of the second blade 223 is fixedly connected to the mounting ring 221. The second blades 223 are alternately arranged with the first blades 222, and each first blades 222 and the adjacent second blades 223 partially overlap with each other. In this way, the first blades 222 and the second blades 223 together form the variable opening 220. The second driving member 224 is connected to each first blade 222 and drives the first blades 222 to rotate. The controller 24 is electrically connected to the second driving member 224. In at least one embodiment, the second driving member 224 is a stepper motor.

Figure 3:
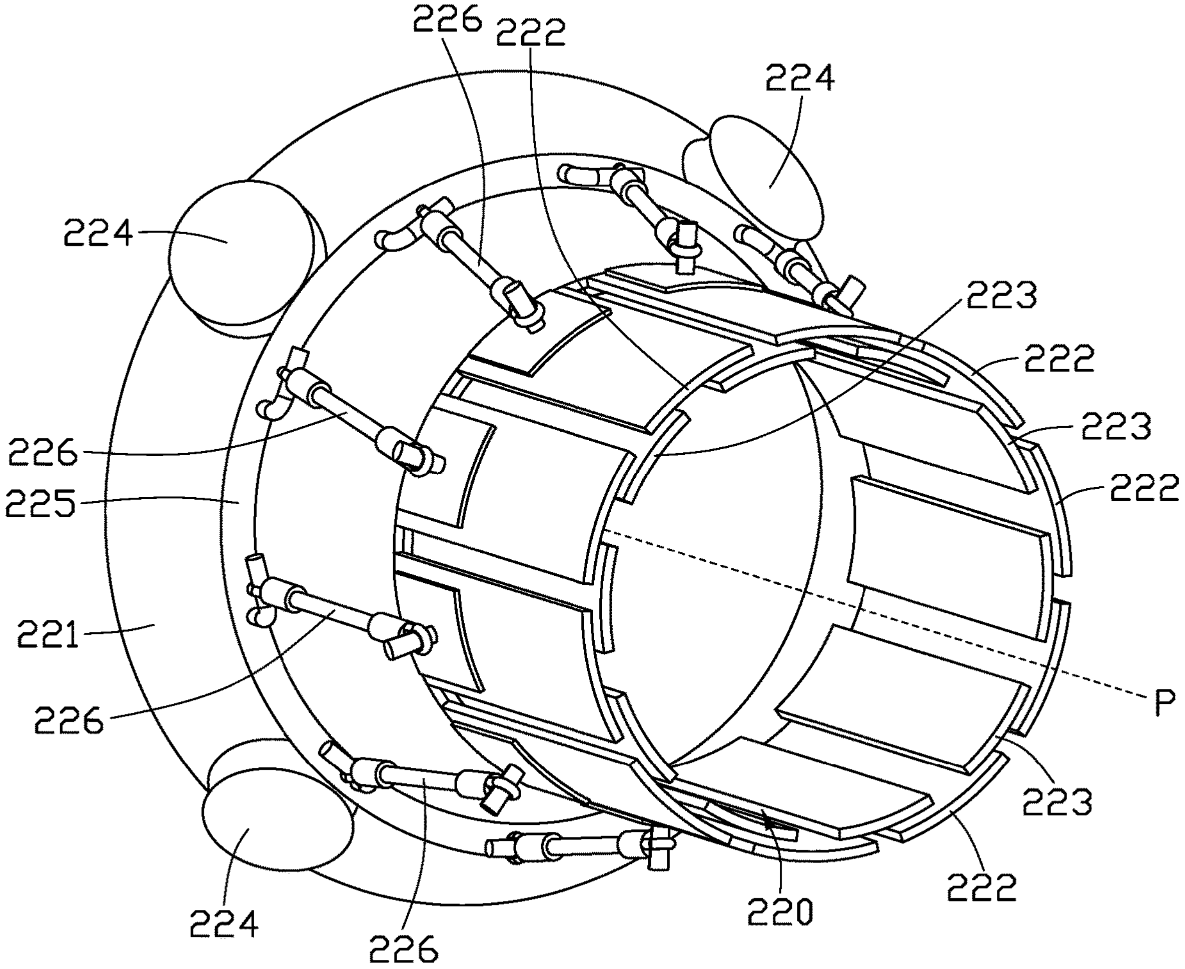
FIG. 3 is a diagrammatic view of a variable hood of the fan shown in FIG. 1, showing a size of a variable opening being reduced.

In use, when the controller 24 controls the second driving member 224 to push the first blades 222 toward the central axis P, an overlapping portion between each first blade 222 and the adjacent second blade 223 increases, thereby reducing the size of the variable opening 220 as shown in FIG. 3. When the controller 24 controls the second driving member 224 to push the first blades 222 away from the central axis P, the overlapping portion between each first blade 222 and the adjacent second blades 223 decreases, thereby increasing the size of the variable opening 220 as shown in FIG. 4.

Figure 4:
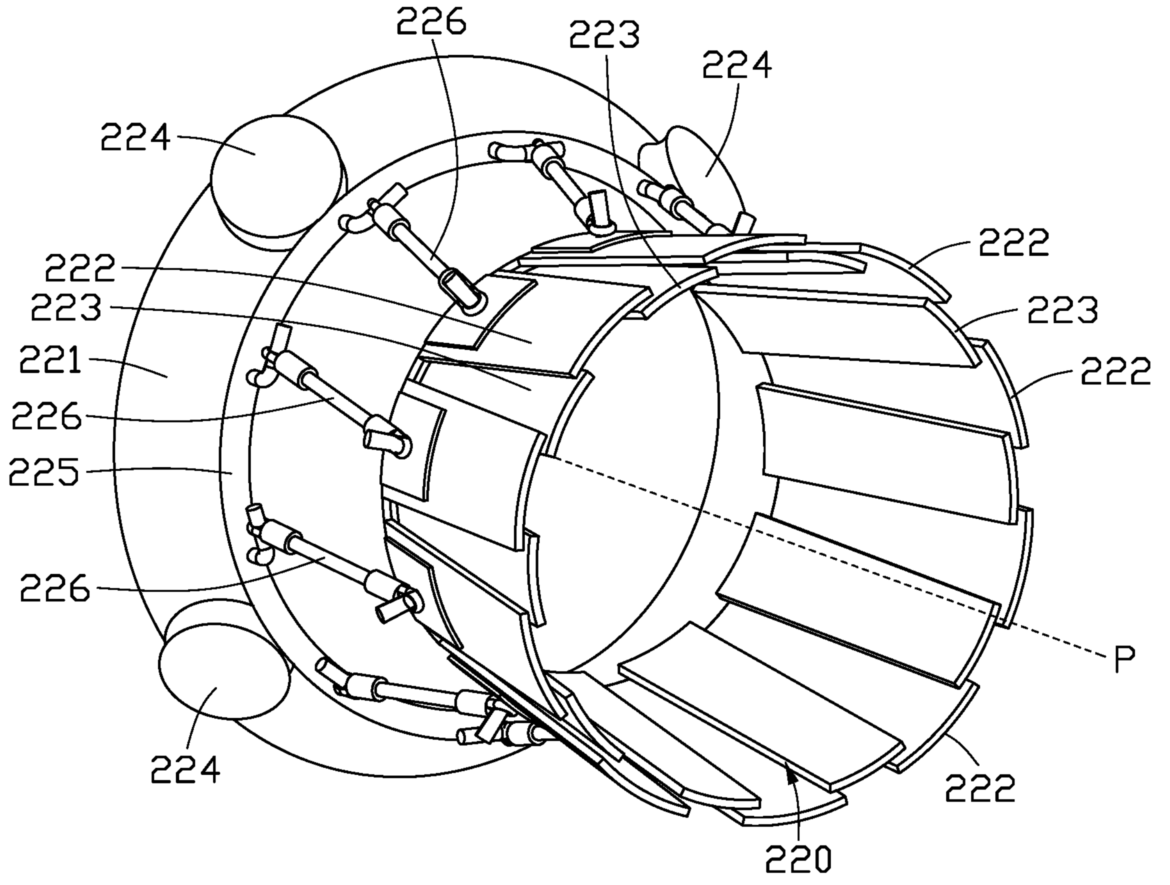
FIG. 4 is a diagrammatic view of the variable hood of the fan shown in FIG. 1, showing the size of the variable opening being increased.

Referring to FIGS. 3 and 4, in this embodiment, the variable hood 22 further includes a movable ring 225 and a plurality of connecting rods 226. The movable ring 225 is roughly parallel to and spaced from the mounting ring 221. Each of the connecting rods 226 is movably connected between the movable ring 225 and one first blade 222. The second driving member 224 is connected to the movable ring 225, thereby driving the movable ring 225 to rotate. As the movable ring 225 rotates, the movable ring 225 drives the first blades 222 to rotate towards or away from the central axis P. In other embodiments, the second driving member 224 may also drive the first blades 222 by hinges.

Referring to FIGS. 1 and 2, in this embodiment, the first sensor 23 is a depth camera module. The first sensor 23 includes an emitter 231, a receiver 232, and an electronic control unit 233. The emitter 231 and the receiver 232 are exposed in the groove 114. The electronic control unit 233 is disposed inside the base 11. The emitter 231 emits infrared laser towards the target object. The receiver 232 receives the infrared laser reflected by the target object. The electronic control unit 233 determines the distance based on the time difference between emitting and receiving the infrared laser. Specifically, the electronic control unit 233 consists of an input circuitry, a microcomputer, and an output circuitry. The input circuitry receives signals from the emitter 231 and the receiver 232, filters and amplifies the signals, and then converts them into a certain voltage level. Both analog and digital signals are sent to the input circuitry of the electronic control unit 233. The analog-to-digital converter can convert analog signals into digital signals, which are then processed by the microcomputer.

In this embodiment, the fan 100 also includes a second sensor 30. The second sensor 30 is disposed on the base 11 and exposed from the groove 114. The second sensor 30 is electrically connected to the controller 24. The second sensor 30 determines whether the target object is a human, and the controller 24 adjusts the size of the variable opening 220 based on the determination results of the second sensor 30. In at least one embodiment, the second sensor 30 is an infrared camera. When a human approaches the fan 100, the human body emits infrared light. The infrared camera can capture this infrared light and determine whether the target object is a human based on the characteristics of the infrared light. For example, the infrared camera can detect information such as the heat distribution and motion trajectory of the human body to determine whether the target object is a human.

In this embodiment, the controller 24 adjusts the size of the variable opening 220 based on the determination results of the infrared camera. When the infrared camera determines that the target object is a human, the controller 24 can control the variable hood 22 to increase the size of the variable opening 220, thereby providing cooling airflow for humans. Conversely, when the infrared camera determines that the target object is not a human (e.g., a pet or other object), the controller 24 can control the variable hood 22 to decrease the size of the variable opening 220, thereby saving energy and reducing noise.

Referring to FIG. 2, in this embodiment, the fan 100 also includes a steering component 40. The first driving member 13 is rotatably connected the end of the supporting column 12. The steering component 40 is used to control the first driving member 13 to rotate. The steering component 40 includes a third driving member 41 and a connecting member 42. The third driving member 41 is fixed to the supporting column 12, and the connecting member 42 is connected to the third driving member 41 and the first driving member 13. The third driving member 41 is electrically connected to the controller 24, and the second sensor 30 can also detect the orientation or location of the target object. In at least one embodiment, the third driving member 41 is a stepper motor, and the connecting member 42 is a gear set.

In use, when the second sensor 30 senses the orientation or location of the target object, the third driving member 41 drives the rotation of the first driving member 13, causing the fan blade assembly 14 connected to the first driving member 13 to face the target object. In this way, an automatic tracking of the target object is achieved.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A fan comprising:

a fan body configured to output an airflow; and an airflow adjusting module disposed on the fan body, the airflow adjusting module configured to change a speed of the airflow based on a distance between a target object and the fan body, the airflow adjusting module comprising:

a first sensor configured to sense the distance between the target object and the fan body;

a variable hood disposed on the fan body, the variable hood defining a variable opening configured for facilitating the airflow through the airflow adjusting module; and a controller electrically connected to each of the first sensor and the variable hood, the controller configured to control the variable hood to adjust a size of the variable opening based on the distance sensed by the first sensor.

2. The fan of claim 1, wherein when the first sensor senses that the distance between the target object and the fan body is increasing, the controller is further configured to send a first command to the variable hood, and the variable hood is configured to reduce the size of the variable opening in response to the first command, thereby increasing a speed of the airflow flowing through the variable opening, and when the first sensor senses that the distance between the target object and the fan body is decreasing, the controller is further configured to send a second command to the variable hood, and the variable hood is configured to increase the size of the variable opening in response to the second command, thereby reducing the speed of the airflow flowing through the variable opening.

3. The fan of claim 1, wherein the fan body comprises a base, a supporting column, a first driving member, and a blade assembly, an end of the supporting column is disposed on one side of the base, the first driving member is connected to another end of the supporting column away from the base, the blade assembly is connected to the first driving member, and the first driving member is configured to drive the blade assembly to rotate.

4. The fan of claim 3, wherein the base comprises a bottom plate, a top plate, and a plurality of connecting plates disposed between the bottom plate and the top plate, and the supporting column is connected to the top plate.

5. The fan of claim 4, wherein a junction area between the top plate and one of the plurality of connecting plates is recessed inwards to form a groove, and a portion of the first sensor is exposed from the groove.

6. The fan of claim 3, wherein the blade assembly comprises a fan seat and a plurality of fan blades connected to the fan seat, and the first driving member is connected to the fan seat.

7. The fan of claim 3, wherein the variable hood further comprises a mounting ring, a plurality of first blades, a plurality of second blades, and a second driving member, the mounting ring defines a central axis, one end of each of the plurality of the first blades is rotatably connected to the mounting ring, another end of each of the plurality of first blades is close to or away from the central axis, one end of each of the plurality of second blades is fixed to the mounting ring, and the plurality of second blades and the plurality of first blades are alternately arranged on the mounting ring.

8. The fan of claim 7, wherein each of the plurality of first blades and a respective one of the plurality of second blades are partially overlapped with each other, the plurality of first blades and the plurality of second blades cooperatively form the variable hood, and the second driving member is connected to each of the plurality of first blades to drive the plurality of first blades to rotate.

9. The fan of claim 8, wherein the controller is further electrically connected to the second driving member.

10. The fan of claim 7, wherein the variable hood further comprises a movable ring and a plurality of connecting rods, each of the plurality of connecting rod is movably connected to the movable ring and one of the plurality of first blades, and the second driving member is connected to the movable ring.

11. The fan of claim 5, wherein the first sensor comprises an emitter, a receiver, and an electronic control unit connected to each of the emitter and the receiver, each of the emitter and the receiver is exposed from the groove, the electronic control unit is arranged inside the base, the emitter is configured to emit infrared laser towards the target object, the receiver is configured to receiving the infrared laser reflected by the target object, and the electronic control unit is further configured to calculate the distance based on a time difference between the emitter emitting the infrared laser and the receiver receiving the infrared laser.

12. The fan of claim 4, further comprising a second sensor, wherein the second sensor is disposed on the base and exposed from the groove, the second sensor is electrically connected to the controller, the second sensor is configured to sense whether the target object is a human, and the controller is further configured to adjust the size of the variable opening based on a sensing result of the second sensor.

13. The fan of claim 9, wherein the first driving member is rotatably disposed on one end of the supporting column, the second sensor is further configured to sense an orientation or a location of the target object relative to the fan body, and the first driving member is further configured to rotate based on the orientation or the location of the target object sensed by the second sensor.

14. The fan of claim 13, further comprising a steering component, wherein the steering component is connected to the each of first driving member and the supporting column, and the steering component is configured to drive the first driving member to rotate relative to the supporting column.

15. The fan of claim 14, wherein the steering component comprises a third driving member and a connecting member, the third driving member is fixed to the supporting column, the connecting member is connected to each of the third driving member and the first driving member, and the third driving member is electrically connected to the controller.

16. The fan of claim 3, further comprising a fixing hood, wherein the variable hood is mounted around a periphery of the fixing hood to form a receiving space, and the fan blade assembly is rotatably housed in the receiving space.

17. The fan of claim 16, wherein the fixing hood comprises a frame and a plurality of ribs, each of the plurality of ribs extends along a radial direction of the frame and is radially spaced on the frame, one end of each of the plurality of ribs is connected to the inner side of the frame, and another end of each of the plurality of ribs is connected to the first driving member.

* * * * *